United States Patent
Cannon et al.

(10) Patent No.: US 6,792,297 B2
(45) Date of Patent: Sep. 14, 2004

(54) METHODS AND SYSTEMS FOR INDICATING CELLULAR TELEPHONE BATTERY-CHARGING INFORMATION

(75) Inventors: Joseph M. Cannon, Harleysville, PA (US); James A. Johanson, Macungie, PA (US)

(73) Assignee: Agere Systems, Inc., Allentown, PA (US)

( * ) Notice: Subject to any disclaimer, the term of this patent is extended or adjusted under 35 U.S.C. 154(b) by 499 days.

(21) Appl. No.: 09/760,857

(22) Filed: Jan. 17, 2001

(65) Prior Publication Data

US 2002/0094849 A1 Jul. 18, 2002

(51) Int. Cl.$^7$ ................................................ H04B 1/38
(52) U.S. Cl. ...................................... 455/573; 455/517
(58) Field of Search ................................ 455/573, 572, 455/574, 575.1, 517; 320/114, 115; 340/636, 539.1

(56) References Cited

U.S. PATENT DOCUMENTS 6,014,011 A * 1/2000 DeFelice et al. ............ 320/114

6,323,775 B1 * 11/2001 Hansson ................... 340/636.1

FOREIGN PATENT DOCUMENTS

JP 10-108386 * 4/1998 ............. H02J/7/35

* cited by examiner

Primary Examiner—Nay Maung
Assistant Examiner—Tu Nguyen

(57) ABSTRACT

Methods and systems are provided for indicating battery information to cellular telephone users when a cellular telephone is near an associated battery charger. When a cellular telephone is within a predetermined range of the battery charger, the charger and telephone form a communication link. The link allows the charger (or telephone) to analyze the status of the telephone's battery, generate alert commands and/or generate sensory alerts as needed in order to warn a user to charge the battery. The charger can also be adapted to establish a communication link with a personal computer ("PC") and to transmit similar commands to the personal computer via the link to allow the PC to generate sensory alerts.

30 Claims, 3 Drawing Sheets

METHODS AND SYSTEMS FOR INDICATING CELLULAR TELEPHONE BATTERY-CHARGING INFORMATION

BACKGROUND OF THE INVENTION

Present day cellular telephones utilize batteries that do not need to be charged on a daily basis. Because of this, a cell phone user often forgets to check the charge level of her cell phone battery for extended periods of time. This leads to the battery losing all of its capacity, leaving the cell phone inoperable. The fact that the battery is dead prevents a user from initiating phone calls as well as receiving incoming phone calls when she is not near a battery charger or an alternative power source.

Existing cell phones have features and functions which attempt to warn users when their batteries are losing capacity. Some display or otherwise indicate "low battery" (i.e., low capacity) warnings and/or a battery's capacity level. Though these displays exist they are ineffective because they are persistent and, thus, often go unnoticed or are ignored. Such displays are analogous to gas gauges in automobiles which also often go unnoticed even when the gauge reads "E" for empty.

One option that has been suggested is to provide a more invasive warning, such as a warning tone. However, such a tone is undesirable because cell phone users would be disturbed by any continuous or regular tone. Yet another option is to provide for such a tone, but in combination with a threshold of some sort (e.g., a tone is emitted for 20 seconds). One disadvantage of this approach is that the selected threshold may cause a warning or alert to be output when a cell phone user can do nothing about it.

There is a need, therefore, to provide methods and devices which provide cell phone users with warnings or alerts in a more effective and intelligent manner, such that the warning/alert can be acted upon in a timely fashion.

It is a desire of the present invention to provide methods and systems for reminding cell phone users to charge their cell phone batteries as well as to provide other information to users (collectively, the reminders and other information are referred to as "charging information"). It is a further desire to provide methods and systems for reminding cell phone users to charge their cell phone batteries which do not require that users remember to check their cell phones for indicators or signals.

SUMMARY OF THE INVENTION

The present invention provides methods and systems for indicating charging information to cell phone users when a cell phone is near an associated charger. According to the present invention, a charger and a cell phone are adapted to establish a communication link with each other when the cell phone is within a predetermined range of the charger. More specifically, the charger and cell phone may comprise Bluetooth linking units and the link they establish may comprise a Bluetooth, piconet connection.

Once a communication link has been established, the linking unit within the charger (referred to as a "charger linking unit") is adapted to transmit an information retrieval command to the linking unit within the cell phone (referred to as a "phone linking unit"). The cell phone is thereafter adapted to obtain charging information and to send the charging information to the cell phone. The charging information may comprise information which is associated with a capacity of the cell phone's battery or and/or battery usage statistics.

Either the charger or the cell phone may comprise an analyzer unit. The analyzer unit is adapted to analyze the charging information and, when appropriate, generate alert commands based on results of the analysis.

The alert commands may be sent to a display device, a sound-emitting device and/or a vibration generating device in order to generate sensory alerts.

The charger may also be adapted to establish a communication link with a PC in order to transmit similar alert commands to the PC.

According to the present invention, a cell phone and charger can be adapted to indicate charging information (e.g., battery capacity) to a user when the cell phone is within a predetermined range of the charger, making it unnecessary for the user to check for the charging information. The methods and systems of the present invention reduce the likelihood that a battery will lose all of its capacity when a power source is unavailable. Other advantages of the present invention will become apparent to those of skill in the art from the drawings, detailed description of the invention and claims that follow.

DETAILED DESCRIPTION OF THE INVENTION

Figure 1:
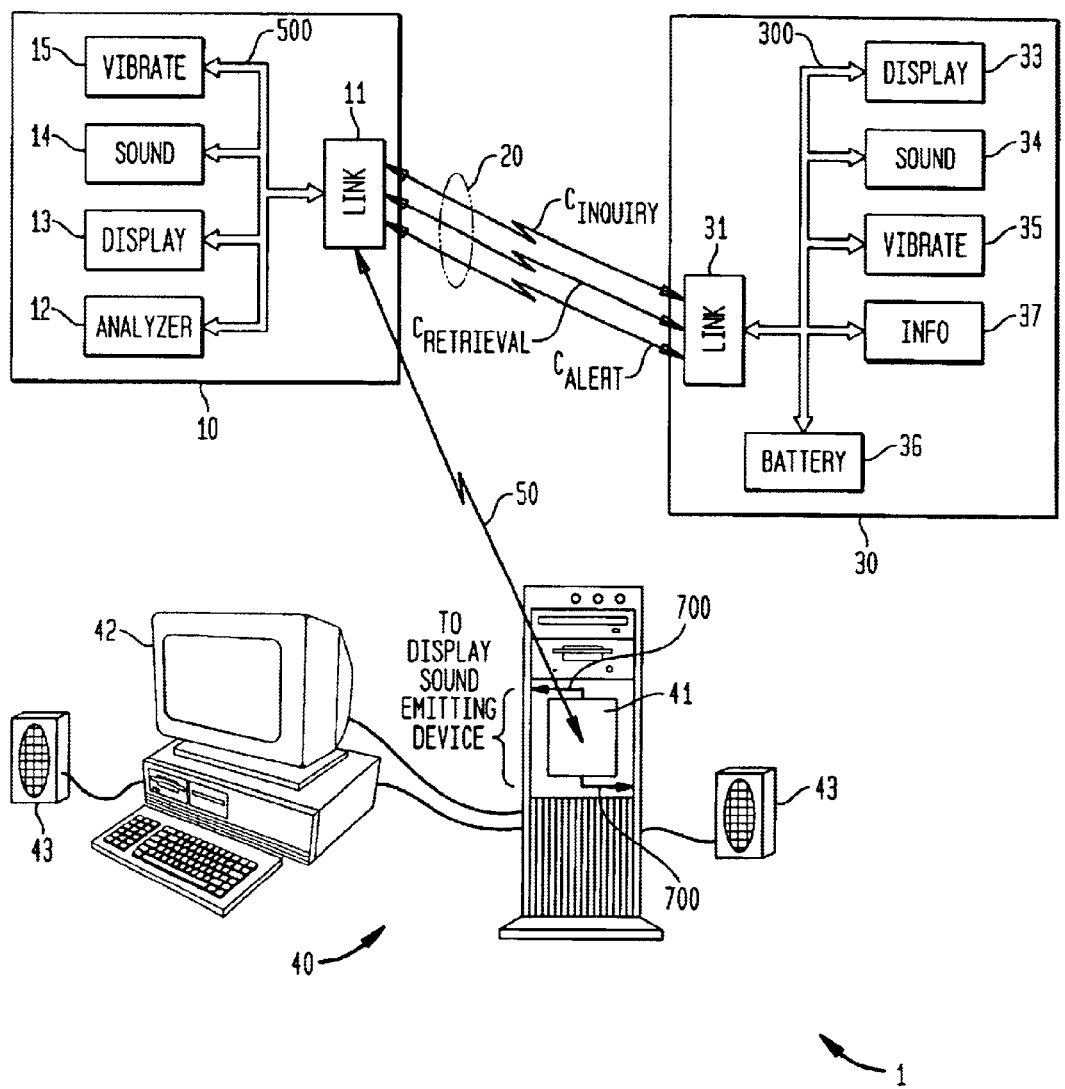
FIG. 1 is an illustrative example of a cellular telephone system according to one embodiment of the present invention.

FIG. 1 is an illustrative example of a cellular telephone system 1. System 1 comprises novel battery charger ("charger") 10, novel cellular telephone ("cell phone") 30 and novel personal computer or PC 40. According to one embodiment of system 1, charger 10 comprises charger linking unit or means 11 and charger analyzer unit or means 12. Analyzer unit 12 can be adapted to be connected to the charger linking unit 11 via pathway 500.

Cell phone 30 comprises phone linking unit or means 31, battery or power supply means 36 and phone information unit or means 37. The information unit 37 is adapted to store charging information associated with battery 36. Cell phone 30 may further comprise one or more of the following devices: phone display or means 33; phone sound-emitting device or means 34; and phone vibration-generating device or means 35. Display 33, sound-emitting device 34 and vibration-generating device 35 may be adapted to be connected to phone linking unit 31 via pathway 300. Though shown as separate units, it should be understood that the units 11–15, 31–37 and 41–43 (see FIGS. 1 and 2) can be combined into fewer units or broken down into additional units. The operation, features and functions of charger 10 and cell phone 30 will now be described in greater detail.

Charger 10 and cell phone 30 are adapted to establish a communication link via illustrative pathway 20. More specifically, charger linking unit 11 is adapted to periodically transmit an inquiry command $C_{inquiry}$ in an attempt to link charger 10 with a compatible device, such as cell phone 30. Similarly, phone linking unit 31 is adapted to periodically scan for the inquiry command $C_{inquiry}$. If the cell phone 30 is located within a predetermined range of charger 10 (e.g., substantially 10 meters), cell phone 30, or more specifically, phone linking unit 31, is adapted to receive the inquiry command $C_{inquiry}$. Once the inquiry command has been received by phone linking unit 31, charger linking unit 11 and phone linking unit 31 are adapted to establish a communication link. Backtracking a little, the inquiry command $C_{inquiry}$ may comprise a programmable identification code which may be transmitted within the inquiry command $C_{inquiry}$, such that only "authorized" devices (i.e., devices that are programmed with the same identification code) may establish a communication link with the charger 10. Upon receiving an inquiry command $C_{inquiry}$, cell phone 30 can be adapted to "identify" itself by transmitting its programmable identification code to charger 10. Only if the identification codes transmitted by charger 10 and cell phone 30 match can a communication link be established between charger 10 and cell phone 30. The comparison of the identification codes may be carried out in the charger 10 by one of many units adapted to do so, including the linking unit 11 or analyzer 12.

According to one embodiment of the invention, linking units 11 and 31 comprise Bluetooth linking units and the communication link comprises a Bluetooth, piconet connection. Bluetooth linking units 11 and 31 may comprise integrated circuits or discrete devices, such as oscillators, memory devices, processors and transmitters/receivers for carrying out the features and functions of the present invention.

Once the communication link has been established, the charger linking unit 11 is adapted to generate an information retrieval command ("retrieval command") $C_{retrieval}$ and to transmit the command to phone linking unit 31 via the communication link 20. In one embodiment of the invention, the information retrieval command $C_{retrieval}$ comprises a command instructing cell phone 30 to obtain charging information. According to one embodiment of the invention, charging information comprises battery capacity information (i.e., information associated with the remaining capacity of battery 36). According to another embodiment of the invention, charging information may comprise battery usage statistics such as, but not limited to, remaining talk time, remaining standby time, time between consecutive charges, average talk time and average charging time.

Phone linking unit 31 is adapted to receive the retrieval command $C_{retrieval}$ and to send the retrieval command $C_{retrieval}$ to phone information unit 37 via pathway 300. Information unit 37 is then adapted to retrieve charging information which, in one embodiment of the invention, is stored within the information unit 37 in response to receiving retrieval command $C_{retrieval}$. The process by which retrieval command $C_{retrieval}$ is transmitted and received, and by which charging information is retrieved can be referred to as a "retrieval process". Thereafter, phone information unit 37 is adapted to send the charging information to phone linking unit 31 (via pathway 300), which is then adapted to transmit the information to charger linking unit 11 via pathway 20.

Continuing, charger linking unit 11 is adapted to receive the charging information and to send the charging information to charger analyzer unit 12 via pathway 500. Charger analyzer unit 12 is adapted to distinguish between different types of charging information. If the charging information comprises battery capacity information, the analyzer 12 is further adapted to analyze the battery capacity information and to determine whether the capacity of battery 36 is above or below (including "at") a threshold capacity level (hereafter "threshold") based on this information.

If the capacity of battery 36 is above the threshold, the retrieval process is repeated after a set or variable amount of time has elapsed. Conversely, according to one embodiment of the invention, if the capacity of battery 36 is below the threshold, analyzer 12 is adapted to generate an alert command $C_{alert}$ (e.g., a "low battery" alert) and to send the alert command $C_{alert}$ to charger linking unit 11 via pathway 500. The analyzer 12 is not the only unit which may generate an alert command $C_{alert}$. According to another embodiment, charger linking unit 11 can be adapted to generate an alert command $C_{alert}$ based on the results generated by analyzer 12.

In addition to battery capacity, the charging information may comprise battery usage statistics. In this instance, analyzer 12 or charger linking unit 11 can be adapted to generate a second alert command $C_{alert2}$ (not shown). The analyzer 12 or charger linking unit 11 can be further adapted to generate the second alert command $C_{alert2}$ after: specified increments of phone usage; a specified elapsed time between consecutive recharging of the battery 36; or a specified elapsed time between consecutive phone uses, just to give a few examples.

According to yet another embodiment of the invention, charger linking unit 11 can be further adapted to transmit the alert commands $C_{alert}$ and/or $C_{alert2}$ to phone linking unit 31 via pathway 20. Upon receiving an alert command, phone linking unit 31 is adapted to send a representation of the alert command to at least one of the following devices via pathway 300: phone display device 33; phone sound-emitting device 34; and/or phone vibration-generating device 35. After receiving a representation of the alert command, display 33 can be adapted to generate a message comprising text and/or images; sound-emitting device 34 can be adapted to emit a distinctive sound pattern or voice communication; and/or vibration-generating device 35 can be adapted to generate a distinctive vibration pattern. The text, image, sound patterns, voice communication and/or vibration patterns (collectively referred to as "sensory alerts") are generated to warn a user to charge the battery 36 when an alert command $C_{alert}$ comprises a low battery warning or to provide the user with other battery usage information when the alert command $C_{alert2}$ comprises a representation of such information or statistics.

Cell phone 30 is not the only device envisioned by the present invention capable of generating sensory alerts responsive to alert commands $C_{alert}$ and $C_{alert2}$. According to another embodiment of the invention, charger 10 can be adapted to generate a sensory alert in substantially the same manner as cell phone 30. Referring again to FIG. 1, charger 10 may additionally comprise one or more of the following devices which are adapted to operate in much the same way as devices 33, 34 and 35: charger display or means 13; charger sound-emitting device or means 14; and/or charger vibration-generating device or means 15. Display 13, sound-emitting device 14 and vibration-generating device 15 may be adapted to be connected to charger linking unit 11 via pathway 500.

When charger linking unit 11 or analyzer 12 is adapted to generate an alert command $C_{alert}$ or $C_{alert2}$, either can be adapted send a representation of an alert command $C_{alert}$ or $C_{alert2}$ to devices 13, 14 and/or 15 via pathway 500.

According to another embodiment of the invention, PC 40 can also be adapted to generate a sensory alert or alerts. PC 40 comprises a PC linking unit or means 41, a PC display or means 42 and a PC sound-emitting device or means 43.

Charger 10 and PC 40 can be adapted to establish a PC communication link via illustrative pathway 50. According to one embodiment of the invention, charger linking unit 11 and PC linking unit 41 can be adapted to establish the PC communication link in substantially the same manner as charger linking unit 11 and phone linking unit 31. In such an embodiment, PC linking unit 41 may comprise a Bluetooth unit having similar features and functions as phone linking unit 31, and the PC communication link may comprise a Bluetooth, piconet connection. According to other embodiments of the invention, the PC communication link may comprise a connection such as, but not limited to, a USB port, parallel port, serial port or infrared port connection. In such embodiments, linking units 11 and 41 comprise compatible components or devices adapted to establish such connections.

Once an alert command $C_{alert}$ or $C_{alert2}$ has been generated, charger linking unit 11 can be adapted to transmit the alert command $C_{alert}$ or $C_{alert2}$ to PC linking unit 41 via pathway 50. According to one embodiment of the invention, PC linking unit 41 can then be adapted to receive the alert command $C_{alert}$ or $C_{alert2}$ and to send a representation of the alert command $C_{alert}$ or $C_{alert}$ to PC display 42 and/or to PC sound-emitting device 43 via pathway 700. Upon receiving the representation, display 42 and/or sound-emitting device 43 can then be adapted to operate in substantially the same manner as displays 13 and 33 and sound-emitting devices 14 and 34, respectively.

It should be noted that either cell phone 30, charger 10 and/or PC 40 can be adapted to generate sensory alerts. Using two or more devices to generate sensory alerts increases the likelihood that a user will notice the alert.

Figure 2:
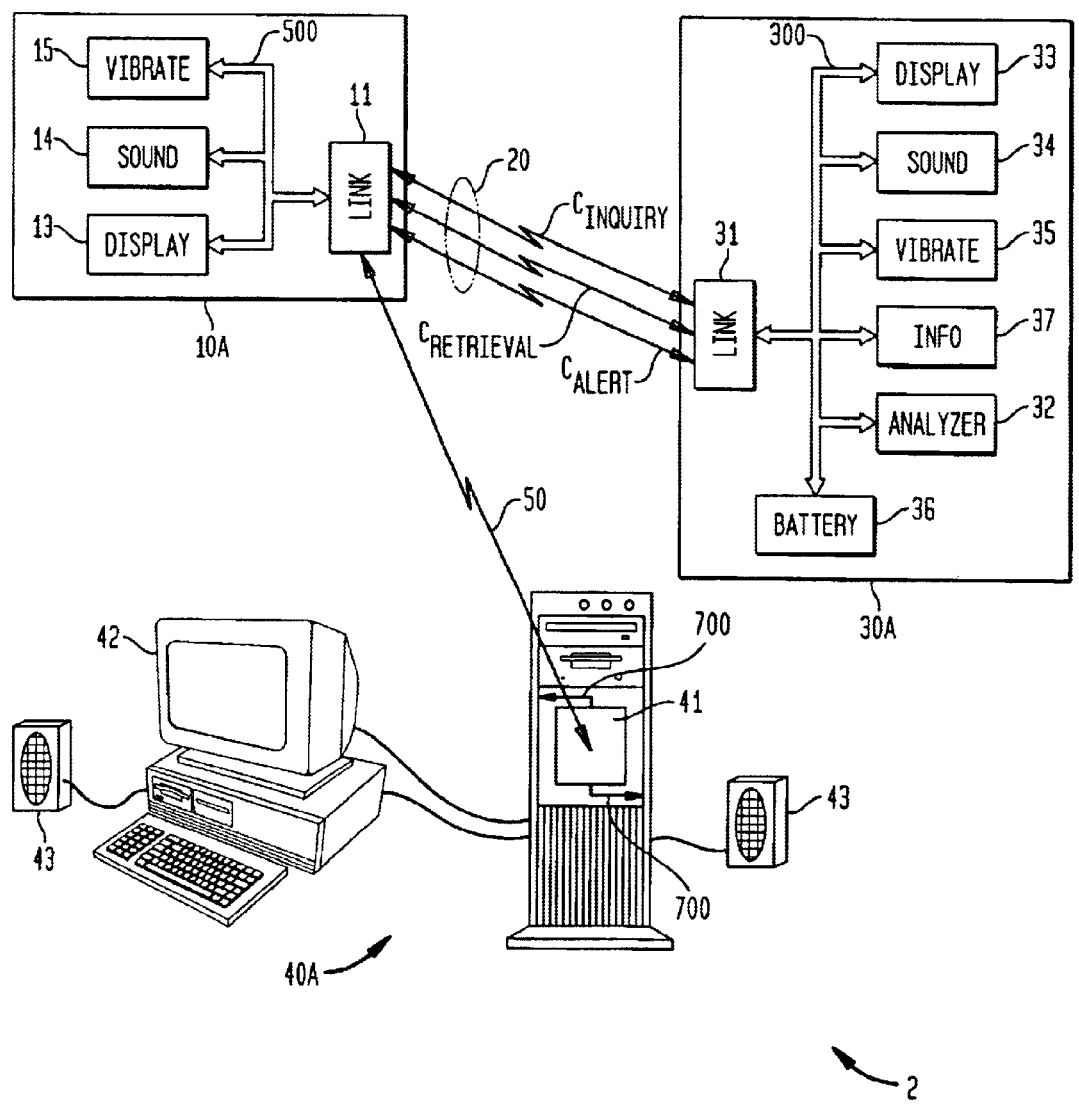
FIG. 2 is an illustrative example of a cellular telephone system according to another embodiment of the present invention.

FIG. 2 is an illustrative example of another cellular telephone system 2 according to the present invention. It should be understood that units shown in FIGS. 1 and 2 which have the same reference numbers are similar devices and/or units. The cellular telephone system 2 shown in FIG. 2 comprises a charger 10A and a cell phone 30A. Like the embodiments of FIG. 1, charger 10A comprises charger linking unit 11. However, unlike the embodiments of FIG. 1, charger 10A does not comprise a charger analyzer unit 12 (thus, it may be referred to as a "simplified" charger). Instead, cell phone 30A comprises a phone analyzer unit 32. Analyzer unit 32 is adapted to carry out similar features and functions as analyzer 12 described in the embodiment of FIG. 1. Thus, cell phone 30A can be adapted to generate alert commands in substantially the same manner as charger 10 of FIG. 1. Placing the analyzer within a phone instead of a charger may help reduce the cost of a charger and simplify its operation. Aside from analyzer 32, cell phone 30A further comprises substantially the same devices and elements as cell phone 30 of FIG. 1.

Simplified charger 10A and cell phone 30A are adapted to establish a communication link in substantially the same way as system 1 of FIG. 1, respectively. Once a communication link has been established, charger linking unit 11, phone linking unit 31 and phone information unit 37 are adapted to carry out the previously described information retrieval process. Information unit 37 is thereafter adapted to send charging information to phone analyzer unit 32 via pathway 300.

According to one embodiment of the invention, phone analyzer 32 is adapted to analyze the charging information and generate an alert command $C_{alert}$ or $C_{alert2}$ in substantially the same manner as phone analyzer 12 shown in system 1 of FIG. 1. Analyzer 32 is thereafter adapted to send the alert command $C_{alert}$ or $C_{alert2}$ to phone linking unit 31. According to still another embodiment of the invention, instead of being adapted to generate an alert command $C_{alert}$ or $C_{alert2}$, analyzer 32 can be adapted to send results of an analysis to phone linking unit 31 which can then be adapted to generate the alert commands $C_{alert}$ or $C_{alert2}$. Cell phone 30A can then be adapted to generate a sensory alert in substantially the same manner described above with respect to system 1 of FIG. 1.

According to another embodiment of the invention, simplified charger 10A can be adapted to generate a sensory alert. That is, phone linking unit 31 can be further adapted to transmit an alert command $C_{alert}$ or $C_{alert2}$ to charger linking unit 11 via pathway 20. Charger linking unit 11 and devices 13, 14 and/or 15 can then be adapted to operate in substantially the same manner as described with respect to system 1 of FIG. 1 in order to generate sensory alerts.

According to yet other embodiments of the invention, PC 40A can be adapted to generate a sensory alert. More specifically, simplified charger 10A and PC 40A can be adapted to establish a communication link in substantially the same manner as described with respect to charger 10 and PC 40 of system 1. Linking units 11 and 41, and devices 42 and 43 can then be adapted to operate in substantially the same manner as described with respect to system 1 of FIG. 1 in order to generate a sensory alert.

Although the charger 10 (or 10A) is shown communicating with only one cell phone 30 (or 30A) in the above-described embodiments, the present invention is not so limited. Rather, the present invention envisions embodiments in which a charger can be adapted to communicate with multiple cell phones. Thus, if a user has multiple cell phones, a single charger can be adapted to establish a communication link with each of, or a selected group of, the user's cell phones. As previously mentioned, the charger linking units, phone linking units and PC linking units that are intended to communicate with one another can be programmed with a unique identification code which must be matched before a communication link can be established. This feature can prevent unwanted communication with other chargers, phones and PCs (e.g., those that belong to a different user).

It should be understood that charger analyzer unit 12 and phone analyzer unit 32 can be adapted to analyze multiple types of charging information and to generate multiple alert commands. When charging information comprises multiple types of information, analyzer units 12 and 32 can be adapted to generate alert commands for each type of information. Devices 13–15, 33–35, 42 and 43 can then be adapted to generate multiple sensory alerts based on various representations of alert commands.

It should be further understood that the linking units and analyzers described herein may comprise one or more programmed devices (e.g. memory and processors). These devices can be adapted to carry out some or all of the functions described above.

Figure 3:
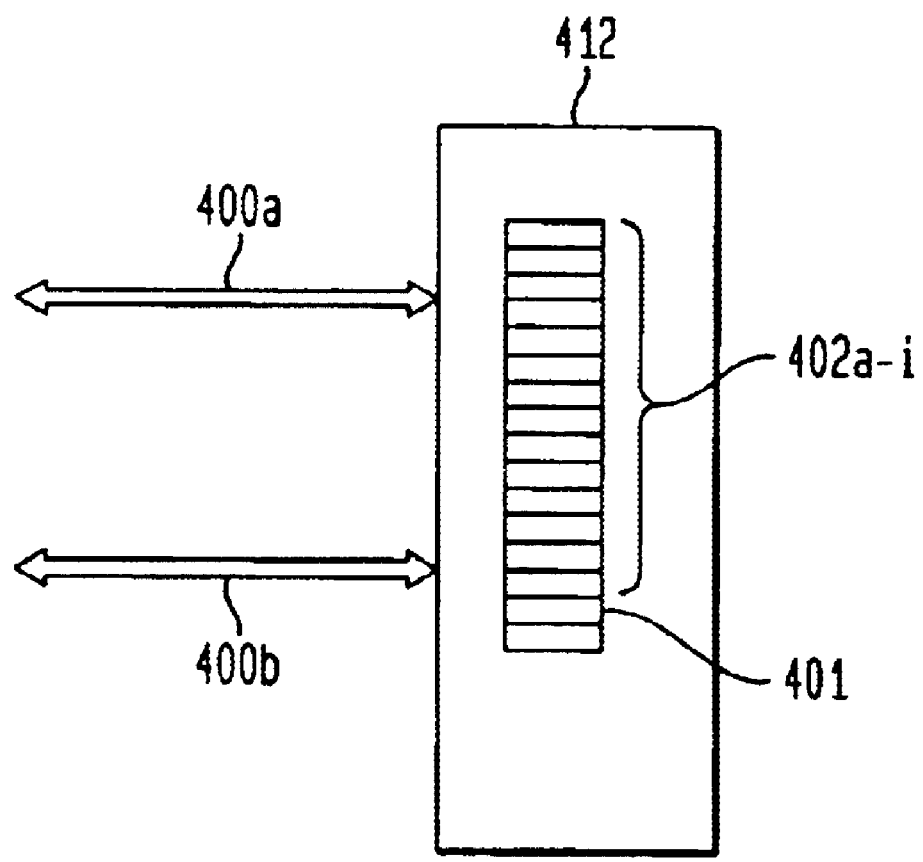
FIG. 3 is an illustrative example of a programmed device according to yet another embodiment of the present invention.

For example, FIG. 3 depicts an overly simplified block diagram of a programmed device 412 adapted to control the generation of alert commands and/or the generation of sensory alerts. The commands and alerts may be sent/received via one or more buses, such as command bus 400a and data bus 400b. In one embodiment of the invention, the programmed medium 412 comprises a program 401 written in a language known in the art. The program 401 in turn comprises program code 402a–i (where i is the last line of code) adapted to control the generation of alert commands and/or sensory alerts.

It should be understood that one or more devices similar to the programmed device 412 may be made a part of the cellular telephones 30/30A, chargers 10/10A and/or PCs 40/40A depending on the configuration desired.

The present invention provides methods and systems for indicating battery information to cell phone users when a cell phone is within a predetermined range of an associated battery charger. The methods and systems of the present invention reduce the likelihood that cell phone batteries will go dead when a battery charger or alternative power source is not available. The methods and systems of the present invention further allow a user to be provided with phone usage statistics when the cell phone is within the predetermined range.

Other advantages of the present invention will be readily apparent to those skilled in the art. It is also to be understood that variations can be made by those skilled in the art without departing from the scope and spirit of the present invention.

What is claimed is:

1. A cellular telephone system comprising:
   a battery charger adapted to:
   wirelessly receive charging information, associated with a cellular telephone, selected from the group consisting of battery capacity and battery usage statistics; and
   generate an alert command when said battery capacity indicates a capacity below a threshold capacity and when the cellular telephone is located within a predetermined range of the charger.

2. The system in claim 1, wherein the battery charger is further adapted to generate a sensory alert responsive to the alert command.

3. The system of claim 1, further comprising a cellular telephone adapted to:
   wirelessly send said charging information to said charger; and
   generate a sensory alert responsive to the alert command.

4. The system of claim 1 further comprising a personal computer adapted to generate a sensory alert responsive to the alert command.

5. The system of claim 1 wherein the range is substantially 10 meters.

6. A cellular telephone system comprising:
   a cellular telephone adapted to:
   wirelessly send charging information, selected from the group consisting of battery capacity and battery usage statistics, to a battery charger; and
   generate an alert command when the telephone is located within a predetermined range of a battery charger.

7. The system of claim 6, wherein the cellular telephone is adapted to generate a sensory alert responsive to the alert command.

8. The system of claim 6 further comprising a battery charger adapted to:
   wirelessly receive the charging information associated with the cellular telephone; and to
   generate a sensory alert responsive to the alert command.

9. The system of claim 6, further comprising a personal computer adapted to generate a sensory alert responsive to the alert command.

10. The system of claim 6 wherein the range is substantially 10 meters.

11. A battery charger adapted to:
    wirelessly receive charging information, associated with a cellular telephone, selected from the group consisting of battery capacity and battery usage statistics; and
    generate a sensory alert responsive to an alert command when the cellular telephone is located within a predetermined range of the charger.

12. The charger of claim 11 wherein the range is substantially 10 meters.

13. A cellular telephone adapted to:
    wirelessly send charging information to a battery charger, said information selected from the group consisting of battery capacity and battery usage statistics; and
    generate a sensory alert responsive to an alert command when the telephone is located within a predetermined range of a battery charger.

14. The telephone of claim 13 wherein the range is substantially 10 meters.

15. A personal computer adapted to generate a sensory alert responsive to an alert command based on battery capacity and battery usage statistics when a cellular telephone is located within a predetermined wireless range of a battery charger.

16. The personal computer of claim 15 wherein the range is substantially 10 meters.

17. A programmed device adapted to:
    control the wireless reception of charging information, associated with a cellular telephone, selected from the group consisting of battery capacity and battery usage statistics; and
    control the generation of an alert command when the cellular telephone is located within a predetermined range of a battery charger.

18. The device of claim 17, wherein the device is further adapted to control the generation of a sensory alert responsive to the alert command.

19. The programmed device of claim 17 wherein the range is substantially 10 meters.

20. A programmed device adapted to:
    control the wireless sending of charging information, associated with a cellular telephone, selected from the group consisting of battery capacity and battery usage statistics to a battery charger; and
    control the generation of a sensory alert responsive to an alert command when the cellular telephone is located within a predetermined range of a battery charger.

21. The programmed device of claim 20 wherein the range is substantially 10 meters.

22. A method for indicating cellular telephone battery charging information comprising:
    wirelessly receiving charging information, associated with a cellular telephone, selected from the group consisting of battery capacity and battery usage statistics; and
    generating an alert command when the cellular telephone is located within a predetermined range of a battery charger.

23. The method of claim 22, further comprising generating a sensory alert responsive to the alert command.

24. The method of claim 22 wherein the range is substantially 10 meters.

25. A method for indicating cellular telephone battery-charging information comprising:
    wirelessly sending charging information, associated with a cellular telephone, selected from the group consisting of battery capacity and battery usage statistics to a battery charger; and
    generating a sensory alert responsive to an alert command when the cellular telephone is located within a predetermined range of a battery charger.

26. The method of claim 25 wherein the range is substantially 10 meters.

27. The system as in claim 1 wherein the battery usage statistics comprise statistics selected from the group consisting of remaining talk time, remaining standby time, time between consecutive charges, average talk time and average charging time.

28. The system as in claim 6 wherein the battery usage statistics comprise statistics selected from the group consisting of remaining talk time, remaining standby time, time between consecutive charges, average talk time and average charging time.

29. The programmed medium as in claim 17 wherein the battery usage statistics comprise statistics selected from the group consisting of remaining talk time, remaining standby time, time between consecutive charges, average talk time and average charging time.

30. The method as in claim 22 wherein the battery usage statistics comprise statistics selected from the group consisting of remaining talk time, remaining standby time, time between consecutive charges, average talk time and average charging time.

\* \* \* \* \*